(12) United States Patent
Li et al.

(10) Patent No.: US 11,200,061 B2
(45) Date of Patent: Dec. 14, 2021

(54) PRE-INSTRUCTION SCHEDULING REMATERIALIZATION FOR REGISTER PRESSURE REDUCTION

(71) Applicant: Microsoft Technology Licensing, LLC, Redmond, WA (US)

(72) Inventors: Xiang Li, Bellevue, WA (US); Michael Alan Dougherty, Issaquah, WA (US); David McCarthy Peixotto, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/780,676

(22) Filed: Feb. 3, 2020

(65) Prior Publication Data

US 2021/0149673 A1 May 20, 2021

Related U.S. Application Data

(60) Provisional application No. 62/937,700, filed on Nov. 19, 2019.

(51) Int. Cl.
*G06F 9/44* (2018.01)
*G06F 9/38* (2018.01)
(Continued)

(52) U.S. Cl.
CPC ........... *G06F 9/3836* (2013.01); *G06F 8/443* (2013.01); *G06F 9/30101* (2013.01);
(Continued)

(58) Field of Classification Search
CPC .... G06F 9/3836; G06F 9/30101; G06F 9/463; G06F 9/4881; G06F 9/3881; G06F 8/443;
(Continued)

(56) References Cited

U.S. PATENT DOCUMENTS 5,557,761 A * 9/1996 Chan .................. G06F 8/445
717/144
5,946,491 A * 8/1999 Aizikowitz ............. G06F 8/441
717/158

(Continued)

OTHER PUBLICATIONS

Ivan D. Baev et al., Prematerialization: Reducing Register Pressure for Free, Sep. 16-20, 2006, [Retrieved on Mar. 9, 2021]. Retrieved from the internet: <URL: https://ieeexplore.ieee.org/stamp/stamp.jsp?tp=&arnumber=7847605> 10 Pages (1-10) (Year: 2006).*

(Continued)

*Primary Examiner* — Anibal Rivera
(74) *Attorney, Agent, or Firm* — Alleman Hall Creasman & Tuttle LLP

(57) ABSTRACT

Examples are disclosed herein that relate to performing rematerialization operation(s) on program source code prior to instruction scheduling. In one example, a method includes prior to performing instruction scheduling on program source code, for each basic block of the program source code, determining a register pressure at a boundary of the basic block, determining whether the register pressure at the boundary is greater than a target register pressure, based on the register pressure at the boundary being greater than the target register pressure, identifying one or more candidate instructions in the basic block suitable for rematerialization to reduce the register pressure at the boundary, and performing a rematerialization operation on at least one of the one or more candidate instructions to reduce the register pressure at the boundary to be less than the target register pressure.

20 Claims, 4 Drawing Sheets

(51) Int. Cl.
*G06F 9/48* (2006.01)
*G06F 8/41* (2018.01)
*G06F 9/30* (2018.01)
*G06F 9/46* (2006.01)
*G06F 8/52* (2018.01)

(52) U.S. Cl.
CPC ............ *G06F 9/463* (2013.01); *G06F 9/4881* (2013.01); *G06F 8/441* (2013.01); *G06F 8/445* (2013.01); *G06F 8/4434* (2013.01); *G06F 8/456* (2013.01); *G06F 8/52* (2013.01); *G06F 9/30* (2013.01)

(58) Field of Classification Search
CPC ... G06F 8/52; G06F 8/441; G06F 8/41; G06F 8/456; G06F 8/445; G06F 8/4442; G06F 8/4434; G06F 9/30
See application file for complete search history.

(56) References Cited

U.S. PATENT DOCUMENTS

| | | | | |
|---|---|---|---|---|
| 6,090,156 | A * | 7/2000 | MacLeod | G06F 8/441 717/157 |
| 6,523,173 | B1 * | 2/2003 | Bergner | G06F 8/441 717/152 |
| 7,278,137 | B1 * | 10/2007 | Fuhler | G06F 8/4434 717/151 |
| 8,411,096 | B1 * | 4/2013 | Mahan | G06F 9/3881 345/522 |
| 8,516,465 | B2 * | 8/2013 | Damron | G06F 8/441 717/154 |
| 8,555,267 | B2 * | 10/2013 | Makarov | 717/151 |
| 9,436,447 | B2 * | 9/2016 | Kong | G06F 8/41 |
| 2002/0095666 | A1 * | 7/2002 | Tabata | G06F 8/443 717/149 |
| 2005/0050533 | A1 * | 3/2005 | Koseki | G06F 8/441 717/158 |
| 2008/0184215 | A1 * | 7/2008 | Baev | G06F 8/441 717/155 |
| 2010/0199270 | A1 * | 8/2010 | Baev | G06F 8/441 717/157 |
| 2011/0219216 | A1 * | 9/2011 | Makarov | G06F 9/30 712/227 |
| 2012/0204163 | A1 * | 8/2012 | Marathe | G06F 8/4442 717/151 |
| 2013/0117734 | A1 * | 5/2013 | Kong | G06F 8/41 717/149 |
| 2015/0277880 | A1 * | 10/2015 | Gschwind | G06F 8/52 717/159 |
| 2016/0179714 | A1 * | 6/2016 | Acharya | G06F 11/00 711/158 |

OTHER PUBLICATIONS

Mouad Bahi et al., Register Reverse Rematerialization, Jul. 8, 2011, [Retrieved on Mar. 9, 2021]. Retrieved from the internet: <URL: https://hal.inria.fr/inria-00607323/document> 11 Pages (1-11) (Year: 2011).*

Rajeev Motwani et al., Combining Register Allocation and Instruction Scheduling, 1995, [Retrieved on Jun. 30, 2021]. Retrieved from the internet: <URL: http://i.stanford.edu/pub/cstr/reports/cs/tn/95/22/CS-TN-95-22.pdf> 17 Pages (1-17) (Year: 1995).*

Rajiv Gupta et al., Register Pressure Sensitive Redundancy Elimination, 1999, [Retrieved on Jun. 30, 2021]. Retrieved from the internet: <URL: https://d1wqtxts1xzle7.cloudfront.net/30773313/Stefan_Jhnichen_Compiler_Construction_8_conf_34.pdf> 16 Pages (107-122) (Year: 1999).*

He, et al., "A System for Rapid, Automatic Shader Level-of-Detail", In Journal of ACM Transactions on Graphics, vol. 34, Issue 6, Nov. 4, 2015, 12 Pages.

Lozano, et al., "Combinatorial Register Allocation and Instruction Scheduling", In Journal of Computing Research Repository, Apr. 2018, pp. 1-49.

Ping, et al., "Vector-Aware Register Allocation for GPU Shader Processors", In Proceedings of the International Conference on Compilers, Architecture and Synthesis for Embedded Systems, Oct. 4, 2015, pp. 99-108.

You, et al., "Compiler-Assisted Resource Management for CUDA Programs", In Proceedings of the 16th Workshop on Compilers for Parallel Computing, Jan. 2012, pp. 1-15.

"International Search Report and Written Opinion Issued in PCT Application No. PCT/US20/057266", dated Feb. 8, 2021, 13 Pages.

Briggs, et al., "Rematerialization", In Proceedings of the ACM Conference on Programming Language Design and Implementation, Jul. 1, 1992, pp. 311-321.

* cited by examiner

PRE-INSTRUCTION SCHEDULING REMATERIALIZATION FOR REGISTER PRESSURE REDUCTION

CROSS REFERENCE TO RELATED APPLICATIONS

This application claims priority to U.S. Provisional Patent Application No. 62/937,700, filed Nov. 19, 2019, the entirety of which is hereby incorporated herein by reference for all purposes.

BACKGROUND

In order for program source code to be executed by a computer, the program source code undergoes a compiling process that translates the program source code into machine code that is recognizable by the computer. During the compiling process, various compiler optimizations may be performed on the program source code. For example, compiler optimizations may be implemented by applying a sequence of optimizing transformations to an input function/program to produce a semantically equivalent output program that uses fewer resources and/or executes faster. Such compiler optimizations may optimize one or more of a program's execution time, memory requirement, and/or power consumption as examples.

SUMMARY

Examples are disclosed herein that relate to performing rematerialization operation(s) on program source code to reduce a register pressure at a boundary of a basic block of the program source code prior to performing instruction scheduling on the program source code. In one example, a method performed by a computer includes, prior to performing instruction scheduling on program source code, for each basic block of a plurality of basic blocks of the program source code, determining a register pressure at a boundary of the basic block, determining whether the register pressure at the boundary of the basic block is greater than a target register pressure, based on the register pressure at the boundary of the basic block being greater than the target register pressure, identifying one or more candidate instructions in the basic block suitable for rematerialization to reduce the register pressure at the boundary of the basic block, and performing a rematerialization operation on at least one of the one or more candidate instructions to reduce the register pressure at the boundary of the basic block to be less than the target register pressure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

During the compiling process, various compiler optimizations may be performed on the program source code. For example, such compiler optimizations may optimize one or more of a program's execution time, memory requirement, and/or power consumption. However, such optimizations can create other issues. As one example, live ranges of variables (i.e., a time in which a variable is stored in a register) in the program can be increased as a result of performing compiler optimizations. As another example, such optimizations may create many new variables in the program that collectively increase register pressure (i.e., a number of live variables relative to a number of available registers to store the variables) and result in spills to memory during register allocation. Such spills to memory may reduce processing performance when the complied machine code is processed by a computing system. Additionally, local per-block instruction scheduling performed before register allocation may have a significant impact on register pressure. For example, in a case where the input code for instruction scheduling has unbalanced cross-block register pressure, instruction scheduling may generate scheduling results which cause additional spills to memory.

Accordingly, examples are disclosed herein that relate to, during a compiling process performed on program source code, performing rematerialization operations to balance cross-block register pressure prior to instruction scheduling. Such cross-block rematerialization may optimize the basic blocks of the source code prior to instruction scheduling such that instruction scheduling may be performed more efficiently (i.e., to produce fewer spills to memory). The resulting compiled code may be executed by a computing system with increased processing performance due to the reduced number of memory write operations as a result of the fewer spills to memory.

Figure 1:
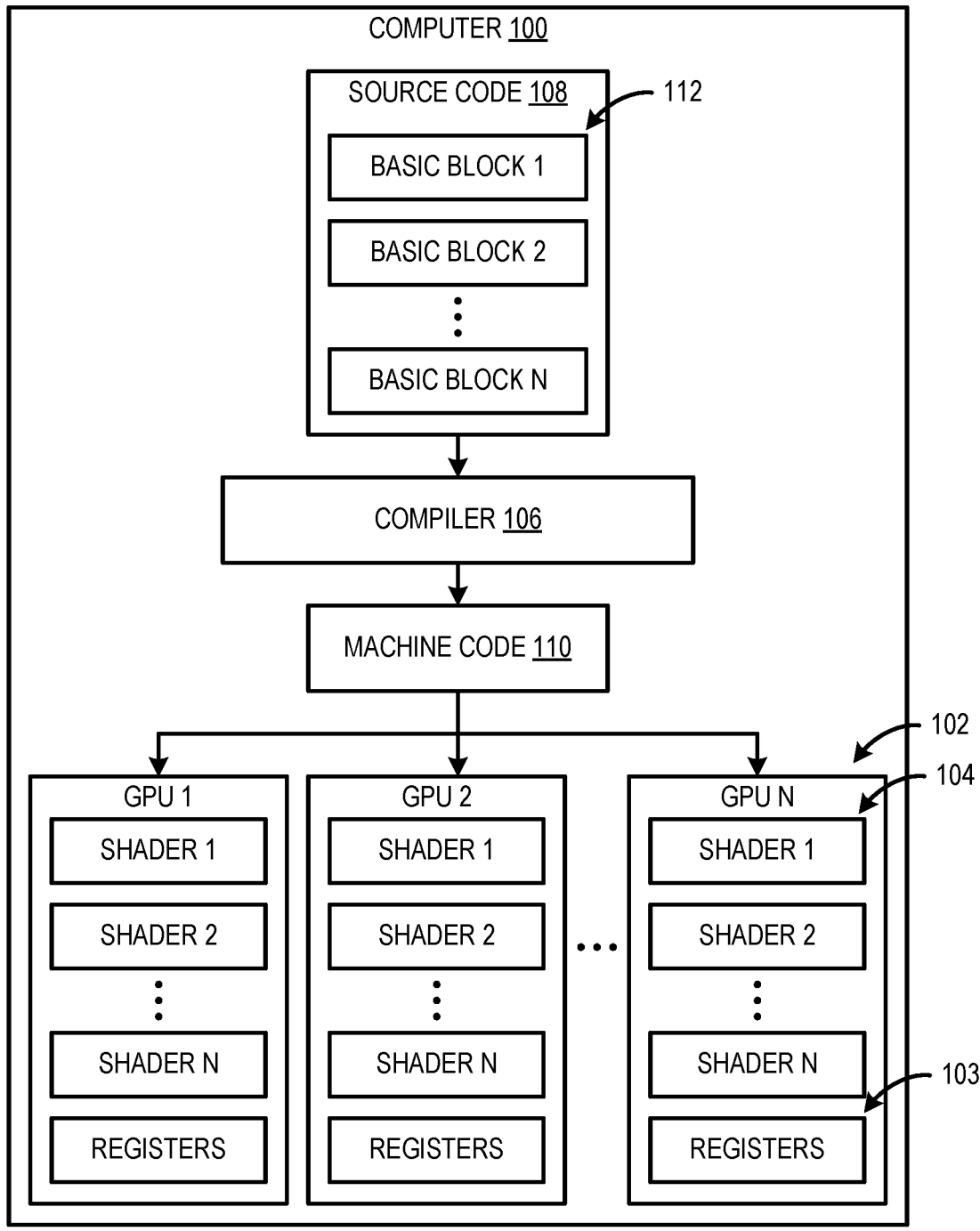
FIG. 1 schematically shows an example computer.

FIG. 1 shows an example computer 100 in simplified form. The computer 100 may include one or more graphics processing units (GPUs) 102 each having a highly parallel structure that allows for efficient processing of large blocks of data in parallel. In the illustrated example, the computer 100 is shown with a plurality of GPUs. The plurality of GPUs 102 may take any suitable form. For example, a GPU can be present on a video card or embedded on a motherboard (along with a central processing unit (CPU) in some cases). Each of the plurality of GPUs 102 may include a plurality of registers 103. Each of the registers 103 may temporarily store values corresponding to different variable during execution of code by the plurality of GPUs 102.

Each of the plurality of GPUs 102 may be configured to execute a plurality of shaders 104. The plurality of shaders 104 may be arranged in a processing pipeline that is well suited for parallel processing. Each of the plurality of shaders 102 may be configured to perform a variety of specialized functions, such as applying transformations to a large set of elements at a time. For example, shaders may apply transformations to each pixel in an area of a display. As another example, shaders may apply transformations to vertices of a model. The plurality of shaders 104 may take any suitable form. Examples of different shaders that may be executed by the plurality of GPUs 102 include pixel shaders, vertex shaders, geometry shaders, and compute shaders.

The computer 100 is configured to execute a compiler 106 that is configured to compile source code 108 from a higher-level programing language into a lower-level language—e.g., into machine code 110 that is processable by the shaders 104 of the GPUs 102. The source code 108 may take any suitable form, including any suitable programing language. For example, the source code 108 may be executed to instantiate software programs including individual or groups of executable files, data files, libraries, drivers, scripts, database records, or other suitable forms of code.

The source code 108 may be organized according to a plurality of basic blocks 112. Each basic block of the plurality of basic blocks 112 may include a sequence of instructions that may be executed without a conditional instruction, such as a jump, branch, or interrupt. In other words, an occurrence of a conditional instruction may create a boundary between different basic blocks.

The compiler 106 may be configured to perform a series of operations to compile the source code 108 into the machine code 110. As part of the compiling process, the compiler 106 may be configured to verify syntax and semantics of the source code according to a specific source language. Such verification may include performing lexical analysis, syntax analysis, and/or semantic analysis.

The compiler 106 further may be configured to transform the source code 108 into an intermediate representation (IR) for further processing. The IR may be a lower-level representation of the program with respect to the source code. The compiler 106 may be configured to perform optimizations on the IR that are independent of the computer architecture being targeted. This source code/machine code independence may enable generic optimizations to be shared between versions of the compiler supporting different languages and target processors. Example optimizations may include removal of useless code (dead code elimination) or unreachable code (reachability analysis), discovery and propagation of constant values (constant propagation), relocation of computation to a less frequently executed place (e.g., out of a loop), or specialization of computation based on the context. The compiler 106 may be configured to perform optimization on the IR to produce an optimized IR. The compiler 106 may be configured to take the optimized IR and perform analysis, transformations and optimizations that are specific for the target computer architecture of the computer 100. The compiler 106 further may be configured to perform instruction scheduling, which re-orders instructions to keep parallel execution units busy by filling delay slots in the processing pipeline. The compiler 106 may be configured to generate target-dependent assembly code, performing register allocation in the process. The compiler 106 may be configured to compile the assembly code into machine code and output the machine code 110 to the plurality of GPUs 102 for processing.

The compiler 106 may be configured to perform various optimizations through the compiling process of translating the source code 108 into the machine code 110. For example, the compiler 106 may be configured to optimize one or more of a program's execution time, memory requirement, and/or power consumption. Compiler optimization may be implemented by applying a sequence of optimizing transformations to an input function/program to produce a semantically equivalent output program that uses fewer resources and/or executes faster. Such optimizations often focus on eliminating redundant computations. However, such optimizations can increase the live ranges of variables (i.e., a time in which a variable is stored in a register). Also, such optimizations may create many new variables that collectively increase register pressure and result in spills to memory during register allocation. Such spills to memory may reduce processing performance when the complied machine code 110 is processed by the shaders 104 of the plurality of GPUs 102. Moreover, local per-block instruction scheduling performed before register allocation may have a significant impact on register pressure. For example, in a case where the input for instruction scheduling has unbalanced cross-block register pressure, instruction scheduling will generate scheduling results which cause additional spills to memory.

Thus, the compiler 106 may be configured to selectively perform rematerialization operations to balance cross-block register pressure prior to instruction scheduling. Such cross-block rematerialization may optimize the basic blocks of the source code prior to instruction scheduling such that instruction scheduling may be performed more efficiently (i.e., to produce fewer spills to memory) that increases shader performance. Rematerialization operations can decrease register pressure by increasing the amount of computations performed while reduce a number of registers being used in a particular basic block of code.

The compiler 106 may be configured to perform the rematerialization operations prior to instruction scheduling in order to provide basic blocks having reduced register pressure that allow for scheduling results to have reduced memory latency (e.g., due to fewer spills to memory). In this way, the compiled code may be processed by the GPUs 102 more efficiently.

Rematerialization may be tightly integrated with register allocation that is performed after instruction scheduling, where rematerialization is used as an alternative to spilling registers to memory. In scenarios where rematerialization is only performed at register allocation, instruction scheduling that is performed prior to register allocation may have inaccurate cross-block register pressures as well as inaccurate intra-block register pressures. By performing rematerialization before instruction scheduling (and also optionally after instruction scheduling), the input code provided for instruction scheduling may have balanced cross-block register pressure that helps the instruction scheduling process generate scheduling results with low register pressure. Moreover, performing cross-block rematerialization prior to instruction scheduling to help lower register pressure may have a lower processing cost as compared to performing global instruction scheduling.

Figure 2:
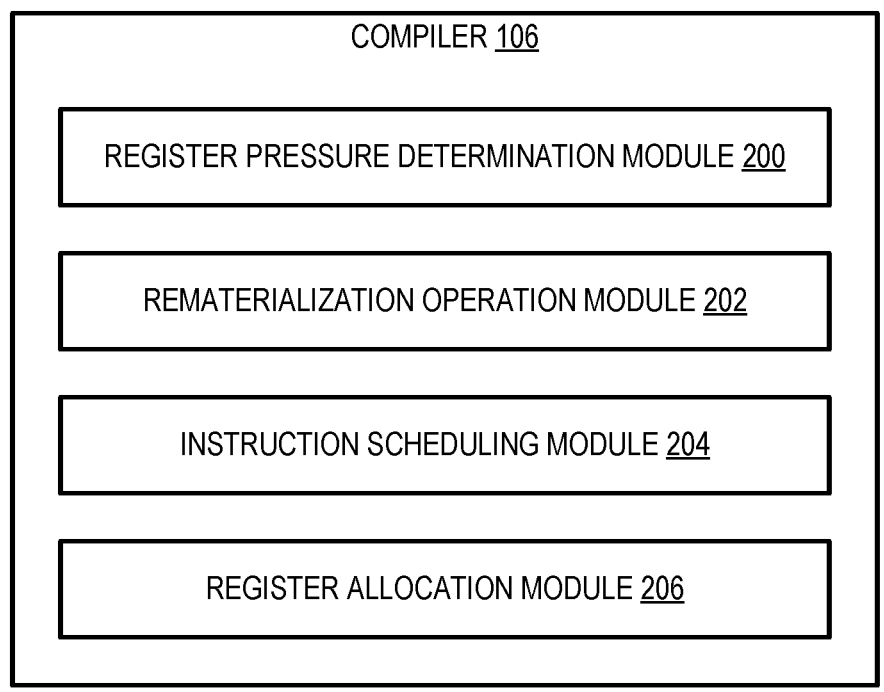
FIG. 2 schematically shows an example compiler executable by a computer.

FIG. 2 shows different example modules of the compiler 106 that may be configured to perform different operations during the compiling process to produce optimized compiled code. The compiler 106 includes a register pressure determination module 200, a rematerialization operation module 202, an instruction scheduling module 204, and a register allocation module 206. Note that the compiler 106 may include additional modules (not shown) that perform other compiling operations.

The register pressure determination module 200 is configured to determine the register pressures at the boundaries of each of the plurality of basic blocks 112 of the source code 108 (or an optimized IR version of the source code) prior to instruction scheduling. The boundaries of a basic block include the first and last instruction of the basic block. The register pressure determination module 200 determines the register pressures at just the boundaries of the basic blocks, because the register pressures of other instructions in the middle of the basic blocks may be inaccurate since instruction scheduling has not yet been performed. The register pressure determination module 200 may determine the register pressures at the boundaries of the basic block in any suitable manner using any suitable algorithm. For example, the register pressure determination module 200 may determine the register pressures based on liveness parameters of variable used by the instructions at the boundaries of the basic blocks.

The rematerialization operation module 202 may be configured to identify basic blocks of the plurality of basic blocks 112 that have a register pressure at a boundary that is greater than a target register pressure. The rematerialization operation module 202 may be configured to, for each basic block having a register pressure at a boundary that is greater than the target register pressure, identify one or more candidate instructions in the basic block that are suitable for rematerialization to help reduce register pressure. The rematerialization operation module 202 may scan each instruction in a basic block to identify candidate instruction(s). The rematerialization operation module 202 may identify candidate instruction(s) in any suitable manner. For example, the rematerialization operation module 202 identify a candidate instruction based on the instruction having redundant variables that would potentially occupy additional registers. Additionally, the rematerialization operation module 202 may be configured to verify that an output of an instruction is not provided as input to another instruction in the basic block in order for that instruction to be considered as a candidate instruction. In other words, none of the candidate instructions in a basic block may comprise an output that is provided as an input to another instruction in the same basic block.

In some cases, no instructions in a particular basic block may qualify as candidates for rematerialization operations. In such cases, the rematerialization operation module 202 may not perform any rematerialization operations on the particular basic block, and instead may move to the next basic block in the code.

The rematerialization operation module 202 further may be configured to, for each basic block having candidate instruction(s), perform one or more rematerialization operations on one or more candidate instructions to help reduce register pressure of the basic block. In some examples, one or more rematerialization operations may be cross-block rematerialization operations where an instruction is moved from one basic block to another basic block. In some examples, the rematerialization operation module 202 may be configured to iteratively perform rematerialization operations on different instructions until the register pressure of the basic block is less than the target register pressure.

The rematerialization operation module 202 may be configured to perform any suitable rematerialization operation on a candidate instruction to reduce register pressure. Example rematerialization operations may include move operations and clone operations. An example rematerialization operation where a redundant variable is replaced is shown in the pseudo code below.

```
Before Rematerialization
float foo ( float a, float b) {
    float c = a+b;          // live a, b
    d = sin( c );           // live c, a, b
    d = d + c;              // live d, c, a, b
    return d + (a*b);       // live d, a, b
}
```

```
After Rematerialization
float foo ( float a, float b) {
    float c = a+b;          // live a, b
    d = sin( c );           // live c, a, b
    d = d + (a+b);          // live d, a, b
    return d + (a*b);       // live d, a, b
}
```

In this example, the variable c is equivalent to a+b. The rematerialization operation replaces the instances of the variable c with a+b in order to open a register that would otherwise hold the variable c. In this way, the rematerialization operation may reduce register pressure in the basic block.

An example rematerialization operation where a variable is moved is shown in the pseudo code below.

```
Before Rematerialization
strct S {
float x;
float y;
float z;
float w;
};
S foo(int a);
float bar(int a, bool cond) {
S s=foo(a);
...
if(cond) {
...//No use of s.
...//But s lives across the if.
}
float c=s.x+s.y+s.z+s.w;
...
return c;
}
After Rematerialization
strct S {
float x;
float y;
float z;
float w;
};
S foo(int a);
float bar(int a, bool cond) {
...
if(cond) {
...//a instead of s is lives across the if.
...//But a is smaller than s, so a register is made available
}
S s=foo(a);
float c=s.x+s.y+s.z+s.w;
...
return c;
}
```

In this example, the value s is instantiated prior to the conditional if statement, such that s lives (i.e., occupies a register) across the if statement. The rematerialization operation moves the instruction that instantiates value s, such that the instruction is executed after the conditional if statement has concluded. The rematerialization operation makes a register available during the conditional if statement that would have otherwise been occupied by the value s. In this way, the rematerialization operation may reduce register pressure in the basic block.

The rematerialization operation module 202 may be configured to perform any suitable number of rematerialization operations on any suitable number of instructions in different basic block of the code to reduce register pressure.

The instruction scheduling module 204 may be configured to perform instruction scheduling by selectively rearranging the order in which instructions are executed in order to improve instruction-level parallelism, which may improve performance of the GPUs 102 when executing the compiled machine code 110. For example, the instruction scheduling module 204 may be configured to rearrange the order of instructions to avoid pipeline stalls. As another example, the instruction scheduling module 204 may be configured to rearrange the order of instructions to avoid illegal or semantically ambiguous operations (e.g., relating to pipeline timing issues or non-interlocked resources). The instruction scheduling module 204 may be configured to perform instruction scheduling in any suitable manner. In the examples discussed herein, instruction scheduling is performed prior to register allocation. In other examples, instruction scheduling may be performed after register allocation or both before and after register allocation.

The register allocation module 206 may be configured to assign target variables of the code onto the registers 103 of the GPUs 102. For example, the register allocation module 206 may be configured to perform register allocation over a basic block (i.e., local register allocation), over a whole function/procedure (i.e., global register allocation), or across function boundaries. The compiler 106 may be configured to generate target-dependent assembly code, performing register allocation in the process via the register allocation module 206. Further, the compiler 106 may be configured to compile the assembly code into machine code and output the machine code 110 to the plurality of GPUs 102 for processing.

Figure 3:
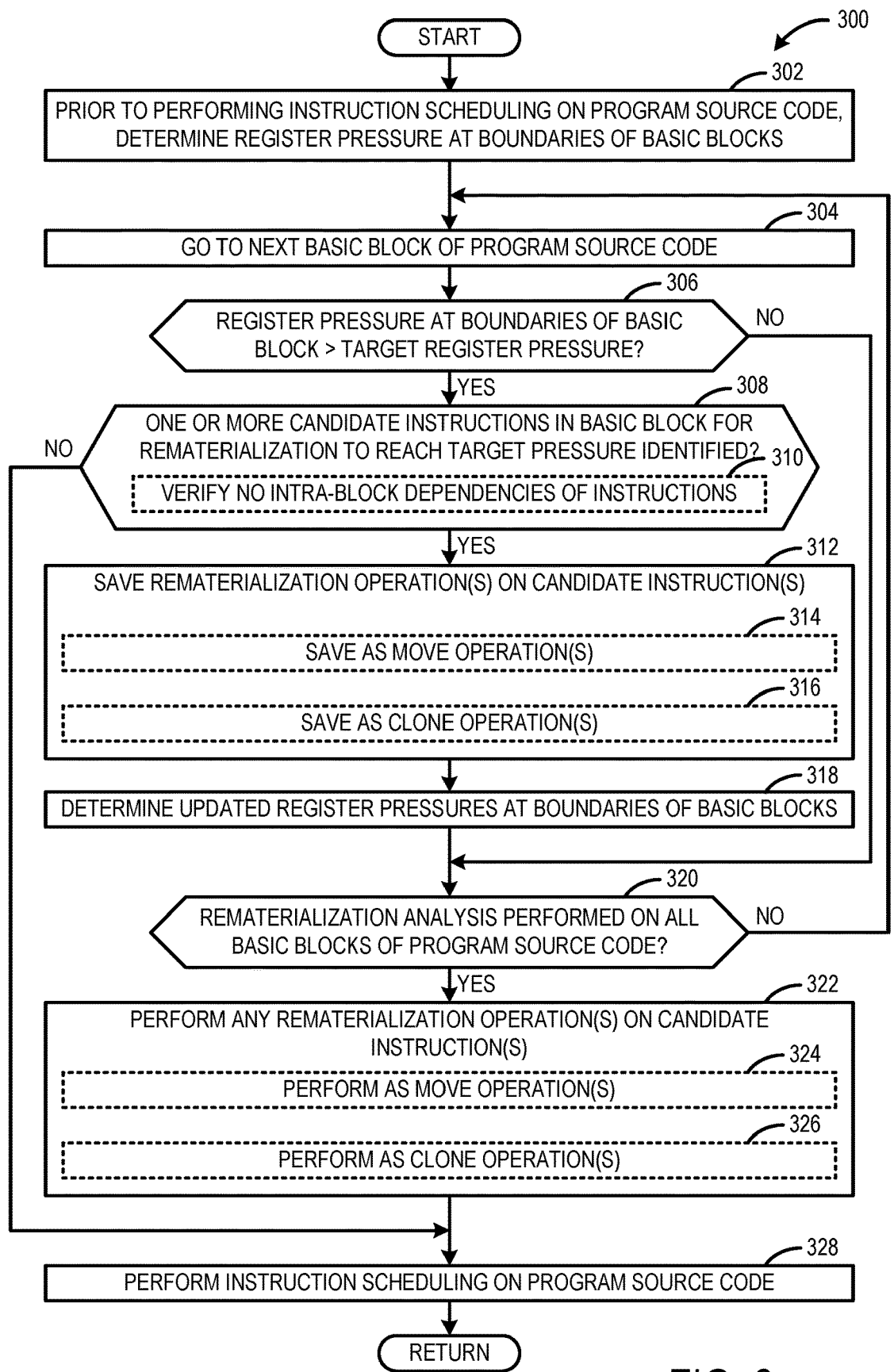
FIG. 3 is a flowchart of an example method for performing rematerialization in basic blocks of program source code prior to instruction scheduling to help reduce register pressure.

FIG. 3 is a flowchart of an example method 300 for performing rematerialization prior to instruction scheduling to help reduce register pressure. For example, the method 300 may be performed by the compiler 106 shown in FIGS. 1 and 2.

At 302, prior to performing instruction scheduling on the program source code, for each basic block of a plurality of basic blocks of the program source code, register pressures are determined at the boundaries of the basic block. For example, the register pressures may be determined by the register pressure determination module 200 of the compiler 106 shown in FIG. 2.

Next, at 304, method 300 moves to a next basic block to be analyzed of the plurality of basic blocks of the program source code. At 306, it is determined whether a register pressure at a boundary of the basic block is greater than a target register pressure. For example, the register pressures analysis may be performed by the rematerialization operation module 202 of the compiler 106 shown in FIG. 2. If a register pressure at a boundary of the basic block is greater than the target register pressure, then the method 300 moves to 308. Otherwise, the method 300 moves to 320 to determine whether rematerialization analysis has been performed on all basic blocks of the program source code.

At 308, it is determined whether one or more candidate instructions in the basic block suitable for rematerialization to reduce register pressure can be identified. In some implementations, at 310, such identifying may include verifying that an instruction does not have any intra-block dependencies where an output of the instruction is provided as input to another instruction in the basic block.

If one or more candidate instructions are identified, then at 312, the one or more rematerialization operations that may be performed on the one or more corresponding candidate instructions are saved. In some examples, at 314, the rematerialization operation(s) optionally may include a move operation. Further, in some examples, at 316, the rematerialization operation(s) optionally may include a clone operation. For example, the rematerialization operation(s) may be saved by the rematerialization operation module 202 of the compiler 106 shown in FIG. 2. In some examples, where multiple candidate instructions are identified, one or more rematerialization operations that are identified to have a relatively larger beneficial effect on register pressure may be saved preferentially over one or more rematerialization operations that are identified to have a relatively smaller beneficial effect on register pressure.

If no candidate instructions are identified that can reduce the register pressure to less than the target register pressure, then the method 300 moves to 328, and instruction scheduling is performed without performing any rematerialization operations prior to performing instruction scheduling.

At 318, updated register pressures at the boundaries of the basic block may be determined based on the saved rematerialization operation(s) theoretically being performed on the corresponding candidate instruction(s). Further, at 320, it is determined whether rematerialization analysis has been performed on all basic blocks of the plurality of basic blocks of the program source code. If all basic block have been analyzed, then the method 300 moves to 322. Otherwise, the method 300 returns to 304 and rematerialization analysis is performed on a next basic block of the plurality of basic blocks of the program source code. At 322, rematerialization operations are performed on any identified candidate instructions in the plurality of basic blocks to help reduce register pressure. In some examples, at 324, the rematerialization operation(s) optionally may include a move operation. Further, in some examples, at 326, the rematerialization operation(s) optionally may include a clone operation. For example, the rematerialization operation(s) may be performed by the rematerialization operation module 202 of the compiler 106 shown in FIG. 2.

In some examples, multiple rematerialization operations may be performed on candidate instructions to collectively reduce register pressure at the boundary of the basic block to be less than the target register pressure. In some examples, rematerialization operations that are identified to have a relatively larger beneficial effect on register pressure may be performed preferentially over one or more rematerialization operations that are identified to have a relatively smaller beneficial effect on register pressure. Generally, rematerialization operations may be selected such that a minimum number of rematerialization operations are performed to reduce register pressure at the boundary of the basic block to be less than the target register pressure.

At 328, once rematerialization operations have been performed on identified candidate instructions in applicable basic blocks of the program source code to help reduce register pressure or no candidate instructions are identified, instruction scheduling is performed on the program source code. For example, instruction scheduling may be performed on the program source code by the instruction scheduling module 204 of the compiler 106 shown in FIG. 2.

The above described method may be performed to optimize the basic blocks of the source code prior to instruction scheduling such that instruction scheduling may be performed more efficiently (i.e., to produce fewer spills to memory). The resulting compiled code may be executed by a computing system with increased processing performance due to the reduced number of memory write operations as a result of the fewer spills to memory.

In some implementations, the methods and processes described herein may be tied to a computing system of one or more computing devices. In particular, such methods and processes may be implemented as a computer-application program or service, an application-programming interface (API), a library, and/or other computer-program product.

Figure 4:
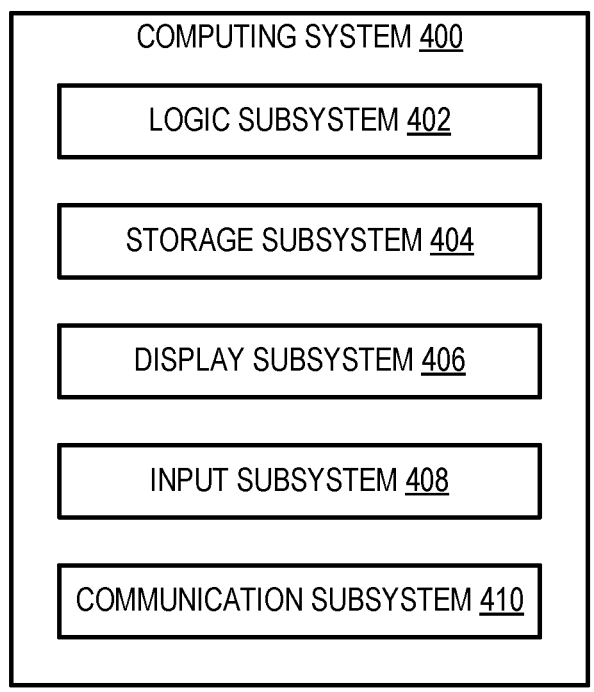
FIG. 4 schematically shows an example computing system.

FIG. 4 schematically shows a simplified representation of a computing system 400 configured to provide any to all of the compute functionality described herein. Computing system 400 may take the form of one or more of personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. As one example, the computing system 400 may take the form of the computer 100 shown in FIG. 1.

Computing system 400 includes a logic subsystem 402 and a storage subsystem 404. Computing system 400 may optionally include a display subsystem 406, input subsystem 408, communication subsystem 410, and/or other subsystems not shown in FIG. 4.

Logic subsystem 402 includes one or more physical devices configured to execute instructions. For example, the logic subsystem 402 may be configured to execute instructions that are part of one or more applications, services, or other logical constructs. The logic subsystem 402 may include one or more hardware processors configured to execute software instructions. Additionally or alternatively, the logic subsystem 402 may include one or more hardware or firmware devices configured to execute hardware or firmware instructions. Processors of the logic subsystem 402 may be single-core or multi-core, and the instructions executed thereon may be configured for sequential, parallel, and/or distributed processing. Individual components of the logic subsystem 402 optionally may be distributed among two or more separate devices, which may be remotely located and/or configured for coordinated processing. Aspects of the logic subsystem 402 may be virtualized and executed by remotely accessible, networked computing devices configured in a cloud-computing configuration.

Storage subsystem 404 includes one or more physical devices configured to temporarily and/or permanently hold computer information such as data and instructions executable by the logic subsystem 402. When the storage subsystem 404 includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem 402 executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 402 and the storage subsystem 404 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

In an example, a method performed by a computer comprises prior to performing instruction scheduling on program source code, for each basic block of a plurality of basic blocks of the program source code, determining a register pressure at a boundary of the basic block, determining whether the register pressure at the boundary of the basic block is greater than a target register pressure, based on the register pressure at the boundary of the basic block being greater than the target register pressure, performing analysis to identify one or more candidate instructions in the basic block suitable for rematerialization to reduce the register pressure at the boundary of the basic block, and performing a rematerialization operation on at least one of the one or more candidate instructions to reduce the register pressure at the boundary of the basic block to be less than the target register pressure. In this example and/or other examples, the rematerialization operation optionally may include a move operation. In this example and/or other examples, the move operation optionally may be a cross-block move operation where an instruction is moved from one basic block to another basic block. In this example and/or other examples, the rematerialization operation optionally may include a clone operation. In this example and/or other examples, the one or more candidate instructions optionally may be identified based on a liveness analysis of instructions in the basic block. In this example and/or other examples, optionally none of the one or more candidate instructions may comprise an output that is provided as an input to another instruction in the basic block. In this example and/or other examples, at least one of the one or more candidate instructions optionally may be identified as a candidate instruction based on having a variable that is redundant in the basic block. In this example and/or other examples, a plurality of candidate instructions optionally may be identified for a basic block, and the method optionally may further comprise selecting a rematerialization operation to perform on a candidate instruction having a relatively larger beneficial effect on the register pressure at the boundary of the basic block over one or more other rematerialization operations to perform on one or more other candidate instructions having a relatively smaller beneficial effect on the register pressure at the boundary of the basic block. In this example and/or other examples, a plurality of candidate instructions optionally may be identified for a basic block, and the method optionally further comprise performing a plurality of rematerialization operations on candidate instructions in the basic block to collectively reduce the register pressure at the boundary of the basic block to be less than the target register pressure. In this example and/or other examples, analysis to identify one or more candidate instructions optionally may be performed for each of the basic blocks of the program source code prior to performing rematerialization operations on candidate instructions in any of the basic blocks. In this example and/or other examples, the method optionally may further comprise for each basic block where the register pressure at the boundary of the basic block is greater than the target register pressure, identifying one or more rematerialization operations to perform on the one or more candidate instructions in the basic block, and upon identifying the one or more rematerialization operations for each basic block, updating a register pressure at the boundary of one or more basic blocks based on the one or more rematerialization operations theoretically being performed. In this example and/or other examples, the method optionally may further comprise performing instruction scheduling on the program source code without performing any rematerialization operations on the program source code based on determining that performing rematerialization operations on the one or more candidate instructions of a basic block does not reduce the register pressure at the boundary of the basic block to be less than the target register pressure.

In another example, a computing system comprises a logic subsystem, a storage subsystem holding instructions executable by the logic subsystem to prior to performing instruction scheduling on program source code, for each basic block of a plurality of basic blocks of the program source code, determine a register pressure at a boundary of the basic block, determine whether the register pressure at the boundary of the basic block is greater than a target register pressure, based on the register pressure at the boundary of the basic block being greater than the target register pressure, perform analysis to identify one or more candidate instructions in the basic block suitable for rematerialization to reduce the register pressure at the boundary of the basic block, and perform a rematerialization operation on at least one of the one or more candidate instructions to reduce the register pressure at the boundary of the basic block to be less than the target register pressure. In this example and/or other examples, optionally none of the one or more candidate instructions may comprise an output that is provided as an input to another instruction in the basic block. In this example and/or other examples, at least one of the one or more candidate instructions optionally may be identified as a candidate instruction based on having a variable that is redundant in the basic block. In this example and/or other examples, a plurality of candidate instructions may be identified for a basic block, and the storage subsystem optionally may hold instructions executable by the logic subsystem to select a rematerialization operation to perform on a candidate instruction having a relatively larger beneficial effect on the register pressure at the boundary of the basic block over one or more other rematerialization operations to perform on one or more other candidate instructions having a relatively smaller beneficial effect on the register pressure at the boundary of the basic block. In this example and/or other examples, a plurality of candidate instructions optionally may be identified for a basic block, and the storage subsystem optionally may hold instructions executable by the logic subsystem to perform a plurality of rematerialization operations on candidate instructions in the basic block to collectively reduce the register pressure at the boundary of the basic block to be less than the target register pressure. In this example and/or other examples, analysis to identify one or more candidate instructions optionally may be performed for each of the basic blocks of the program source code prior to performing rematerialization operations on candidate instructions in any of the basic blocks, and the storage subsystem optionally may hold instructions executable by the logic subsystem to, for each basic block where the register pressure at the boundary of the basic block is greater than the target register pressure, identify one or more rematerialization operations to perform on the one or more candidate instructions in the basic block, and upon identifying the one or more rematerialization operations for each basic block, update a register pressure at the boundary of one or more basic blocks based on the one or more rematerialization operations theoretically being performed. In this example and/or other examples, the storage subsystem optionally may hold instructions executable by the logic subsystem to perform instruction scheduling on the program source code without performing any rematerialization operations on the program source code based on determining that performing rematerialization operations on the one or more candidate instructions of a basic block does not reduce the register pressure at the boundary of the basic block to be less than the target register pressure.

In another example, a method performed by a computer comprises prior to performing instruction scheduling on program source code, for each basic block of a plurality of basic blocks of the program source code, determining a register pressure at a boundary of the basic block, determining whether the register pressure at the boundary of the basic block is greater than a target register pressure, based on the register pressure at the boundary of the basic block being greater than the target register pressure, performing analysis to identify one or more candidate instructions in the basic block suitable for rematerialization to reduce the register pressure at the boundary of the basic block, and based on determining that performing a rematerialization operation on at least one of the one or more candidate instructions would reduce the register pressure at the boundary of the basic block to be less than the target register pressure, performing the rematerialization operation on at least one of the one or more candidate instructions, and based on determining that, for any basic block of the plurality of basic blocks of the program source code, performing a rematerialization operation on at least one of the one or more candidate instructions would not reduce the register pressure at the boundary of any basic block to be less than the target register pressure, performing instruction scheduling on the program source code without performing any rematerialization operations on the program source code.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computer, the method comprising:
   prior to performing instruction scheduling on program source code, for each basic block of a plurality of basic blocks of the program source code,
     determining a register pressure at a boundary of the basic block;
     determining whether the register pressure at the boundary of the basic block is greater than a target register pressure;
     based on the register pressure at the boundary of the basic block being greater than the target register pressure, performing analysis to identify one or more candidate instructions in the basic block suitable for rematerialization to reduce the register pressure at the boundary of the basic block; and performing a rematerialization operation on at least one of the one or more candidate instructions to reduce the register pressure at the boundary of the basic block to be less than the target register pressure.

2. The method of claim 1, wherein the rematerialization operation includes a move operation.

3. The method of claim 2, wherein the move operation is a cross-block move operation where an instruction is moved from one basic block to another basic block.

4. The method of claim 1, wherein the rematerialization operation includes a clone operation.

5. The method of claim 1, wherein the one or more candidate instructions are identified based on a liveness analysis of instructions in the basic block.

6. The method of claim 1, wherein none of the one or more candidate instructions comprises an output that is provided as an input to another instruction in the basic block.

7. The method of claim 1, wherein at least one of the one or more candidate instructions is identified as a candidate instruction based on having a variable that is redundant in the basic block.

8. The method of claim 1, wherein a plurality of candidate instructions are identified for a basic block, and wherein the method further comprises selecting a rematerialization operation to perform on a candidate instruction having a relatively larger beneficial effect on the register pressure at the boundary of the basic block over one or more other rematerialization operations to perform on one or more other candidate instructions having a relatively smaller beneficial effect on the register pressure at the boundary of the basic block.

9. The method of claim 1, wherein a plurality of candidate instructions are identified for a basic block, and wherein the method further comprises performing a plurality of rematerialization operations on candidate instructions in the basic block to collectively reduce the register pressure at the boundary of the basic block to be less than the target register pressure.

10. The method of claim 1, wherein analysis to identify one or more candidate instructions is performed for each of the basic blocks of the program source code prior to performing rematerialization operations on candidate instructions in any of the basic blocks.

11. The method of claim 10, further comprising:
for each basic block where the register pressure at the boundary of the basic block is greater than the target register pressure, identifying one or more rematerialization operations to perform on the one or more candidate instructions in the basic block, and
upon identifying the one or more rematerialization operations for each basic block, updating a register pressure at the boundary of one or more basic blocks based on the one or more rematerialization operations theoretically being performed.

12. The method of claim 1, further comprising:
performing instruction scheduling on the program source code without performing any rematerialization operations on the program source code based on determining that performing rematerialization operations on the one or more candidate instructions of a basic block does not reduce the register pressure at the boundary of the basic block to be less than the target register pressure.

13. A computing system, comprising:
a logic subsystem;
a storage subsystem holding instructions executable by the logic subsystem to:
prior to performing instruction scheduling on program source code, for each basic block of a plurality of basic blocks of the program source code,
determine a register pressure at a boundary of the basic block;
determine whether the register pressure at the boundary of the basic block is greater than a target register pressure;
based on the register pressure at the boundary of the basic block being greater than the target register pressure, perform analysis to identify one or more candidate instructions in the basic block suitable for rematerialization to reduce the register pressure at the boundary of the basic block; and
perform a rematerialization operation on at least one of the one or more candidate instructions to reduce the register pressure at the boundary of the basic block to be less than the target register pressure.

14. The computing subsystem of claim 13, wherein none of the one or more candidate instructions comprises an output that is provided as an input to another instruction in the basic block.

15. The computing subsystem of claim 13, wherein at least one of the one or more candidate instructions is identified as a candidate instruction based on having a variable that is redundant in the basic block.

16. The computing subsystem of claim 13, wherein a plurality of candidate instructions are identified for a basic block, and wherein the storage subsystem holds instructions executable by the logic subsystem to select a rematerialization operation to perform on a candidate instruction having a relatively larger beneficial effect on the register pressure at the boundary of the basic block over one or more other rematerialization operations to perform on one or more other candidate instructions having a relatively smaller beneficial effect on the register pressure at the boundary of the basic block.

17. The computing subsystem of claim 13, wherein a plurality of candidate instructions are identified for a basic block, and wherein the storage subsystem holds instructions executable by the logic subsystem to perform a plurality of rematerialization operations on candidate instructions in the basic block to collectively reduce the register pressure at the boundary of the basic block to be less than the target register pressure.

18. The computing subsystem of claim 13, wherein analysis to identify one or more candidate instructions is performed for each of the basic blocks of the program source code prior to performing rematerialization operations on candidate instructions in any of the basic blocks, and wherein the storage subsystem holds instructions executable by the logic subsystem to, for each basic block where the register pressure at the boundary of the basic block is greater than the target register pressure, identify one or more rematerialization operations to perform on the one or more candidate instructions in the basic block, and upon identifying the one or more rematerialization operations for each basic block, update a register pressure at the boundary of one or more basic blocks based on the one or more rematerialization operations theoretically being performed.

19. The computing subsystem of claim 13, wherein the storage subsystem holds instructions executable by the logic subsystem to perform instruction scheduling on the program source code without performing any rematerialization operations on the program source code based on determining that performing rematerialization operations on the one or more candidate instructions of a basic block does not reduce the register pressure at the boundary of the basic block to be less than the target register pressure.

20. A method performed by a computer, the method comprising:
prior to performing instruction scheduling on program source code, for each basic block of a plurality of basic blocks of the program source code,
determining a register pressure at a boundary of the basic block;
determining whether the register pressure at the boundary of the basic block is greater than a target register pressure;
based on the register pressure at the boundary of the basic block being greater than the target register pressure, performing analysis to identify one or more candidate instructions in the basic block suitable for rematerialization to reduce the register pressure at the boundary of the basic block; and
based on determining that performing a rematerialization operation on at least one of the one or more candidate instructions would reduce the register pressure at the boundary of the basic block to be less than the target register pressure, performing the rematerialization operation on at least one of the one or more candidate instructions; and
based on determining that, for any basic block of the plurality of basic blocks of the program source code, performing a rematerialization operation on at least one of the one or more candidate instructions would not reduce the register pressure at the boundary of any basic block to be less than the target register pressure, performing instruction scheduling on the program source code without performing any rematerialization operations on the program source code.

* * * * *